United States Patent
Vo et al.

[11] Patent Number: 5,366,340
[45] Date of Patent: Nov. 22, 1994

[54] ROBOTIC END EFFECTOR

[75] Inventors: Thong H. Vo, Webster; William A. Hammond, Rochester, N.Y.

[73] Assignee: Xerox Corporation, Stamford, Conn.

[21] Appl. No.: 937,073

[22] Filed: Aug. 28, 1992

[51] Int. Cl.⁵ .................................................. B66C 1/54
[52] U.S. Cl. .................................... 414/732; 414/783; 294/94
[58] Field of Search ............... 414/680, 729, 732, 783, 414/222, 225; 294/93, 94, 86.25, 96, 86.24; 901/6

[56] References Cited

U.S. PATENT DOCUMENTS

| | | | |
|---|---|---|---|
| 1,358,807 | 11/1920 | Wilkinson | 294/96 X |
| 2,191,000 | 2/1940 | Thomas | 294/96 X |
| 2,487,456 | 11/1949 | Lowrey | 294/96 X |
| 3,734,328 | 5/1973 | Dalglish | 414/783 |
| 4,266,905 | 5/1981 | Birk et al. | 414/627 |
| 4,291,910 | 9/1981 | Maupate | 294/95 |
| 4,340,249 | 7/1982 | Bucklew | 294/95 |
| 4,576,407 | 3/1986 | Lambert | 294/97 |
| 4,580,826 | 4/1986 | Carrer et al. | 294/86.17 |
| 4,747,997 | 5/1988 | Boatwright | 294/94 X |
| 4,777,792 | 10/1988 | Marzoli | 294/93 |
| 4,799,853 | 1/1989 | Wrobbel et al. | 414/730 |

Primary Examiner—Donald W. Underwood

[57] ABSTRACT

An end effector for a robotic assembly for acquiring and manipulating articles having a substantially cylindrical aperture therein. The end effector has a cylindrical gripping portion having radially expandable fingers and a collar portion adapted to bear on the article. When the fingers are inserted into the aperture in the article and expanded the object is gripped over a large portion of the circumference of the aperture. The article is then translated from a vertical to horizontal position. The gripping portion is provided with a flat portion to allow the article to be contacted against a stop for easy withdrawal of the fingers. The entire cylindrical gripping portion is flexibly mounted to the robotic assembly to allow acquisition of an article presented to the gripping portion of the end effector in an off vertical alignment.

9 Claims, 7 Drawing Sheets

ROBOTIC END EFFECTOR

This invention relates generally to an end effector for use with a robotic assembly, and more particularly concerns an apparatus for acquiring and manipulating individual articles having a substantially cylindrical aperture therein from a supply of articles thereof roughly aligned in a storage area.

There are a wide variety of assembly line operations involving the handling and processing of individual articles. In such operations, robotic assemblies have been employed to automate the handling and processing of these articles. End effectors are employed by the robotic assembly to acquire an individual article from a supply of articles and to transport each article to a different location. It is often desirable to be able to manipulate the acquired article from a vertical to horizontal position for loading as upon a pallet, for example.

In the assembly line environment, the individual articles to be acquired by the robotic assembly are not always presented in a precise vertical alignment to the gripping device and the gripping device should be able to adapt to and acquire these misaligned articles. It is also desirable to be able to handle articles of various wall thicknesses. Additionally, the ability to accurately position an article from the vertical to the horizontal position for loading, such as upon a pallet, is also desirable. Various techniques have been devised for acquiring work pieces using robotic assemblies.

The following disclosures may be relevant to various aspects of the present invention.

Relevant portions of the following disclosures may be briefly summarized as follows:

U.S. Pat. No. 4,799,583 discloses an apparatus which acquires articles having a substantially cylindrical aperture wherein the apparatus grips the article on the interior wall of the cylindrical aperture, The gripper is moved to retract the article from a source and the article is moved to a receiving member which aligns the longitudinal axis of the cylindrical aperture of the article substantially parallel or coincidental with the longitudinal of the receiving member.

U.S. Pat. No. 4,576,407 discloses a robot hand for lifting a panel having an aperture utilizing a pair of tong fingers pivotably mounted on a housing having a locating face. The tong fingers are inserted through the aperture in the panel and an air cylinder operates a linkage to spread the tong fingers thereby gripping the underside of the panel and allowing it to be lifted.

U.S. Pat. No. 4,580,826 discloses a retrieval tool to retrieve loose pipe and the like from a well. A bell-mouthed centering device is inserted in the well and a spear passes through the centering device into the loose pipe. Gripping devices carried by the spear engage the pipe so as to pull it to the surface.

U.S. Pat. No. 4,340,249 discloses a jar pick-up assembly having a plurality of pivotal fingers insertable into the mouth of a jar when in a closed retracted position and expandable within the jar to engage the interior surfaces to allow the jar to be picked up. An annular stabilizing member adapted to bear on an exterior surface of the jar in cooperation with the fingers stabilizes the jar while it is being lifted and carried from one location to another.

U.S. Pat. No. 4,291,901 discloses an apparatus for grasping hollow bodies, such as bottles from the inside. On a movable rod inside a housing are mounted a structure adapted to engage the rim of the bottle and grasping arms which can be inserted into the neck of the bottle. A force is applied to the rod against a spring-bias, so as to urge the rod and the grasping arms towards the bottle. If the structure engages the rim of the bottle after its release, the structure is prevented from moving back into the housing and relative movement between the rod and the structure causes the grasping arms to engage the inside of the bottle. If no bottle is present, the structure is resecured to the rod towards the end of its outward stroke and on the return stroke of the rod, the structure is returned to within the housing.

U.S. Pat. No. 4,266,905 discloses an apparatus for acquiring individual work pieces from a supply of randomly oriented work pieces in a storage bin. The apparatus includes a movably mounted head assembly having a gripper connected thereto by an intermediate flexible support, The gripper operates to grip a work piece and the flexible support is then retracted to lock the gripper against an abutment surface fixed relative to the head assembly.

In accordance with one aspect of the present invention, there is provided an apparatus for acquiring and manipulating an individual article having interior walls defining an cylindrical aperture therein. The apparatus comprises means for gripping the article, said gripping means being adapted to contact the interior walls of the article so as to distribute the gripping force over a sufficient area of the inner walls to minimize stress and deflection of the article. Means for moving said gripping means into the aperture of the article and retracting said gripping means with the article secured releasably thereto is provided. Means for rotating said moving means so as to rotate the article longitudinal axis from a first position to a second position transverse thereto is also provided.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
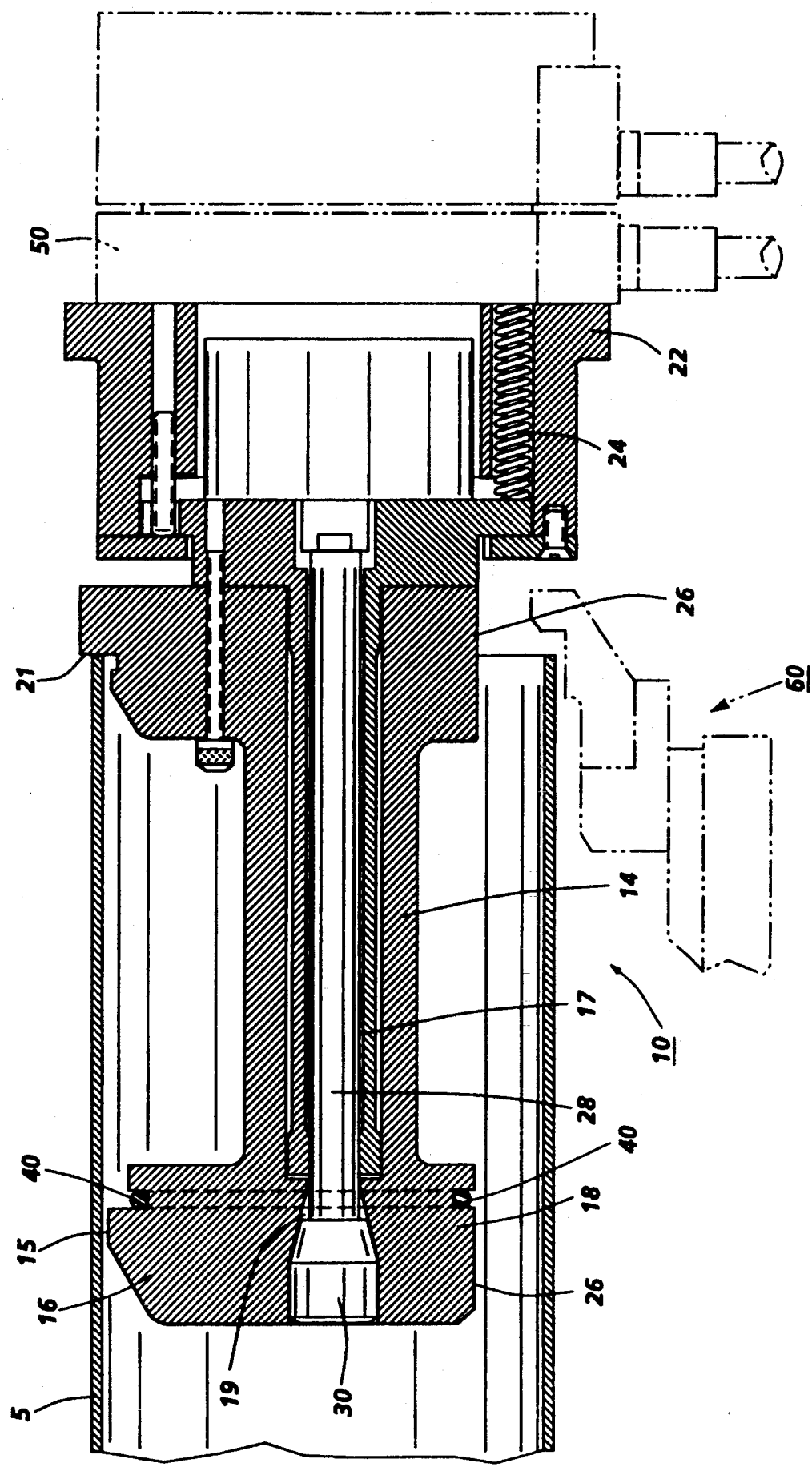
FIG. 1 is a side elevation of the end effector of the present invention.
Figure 2:
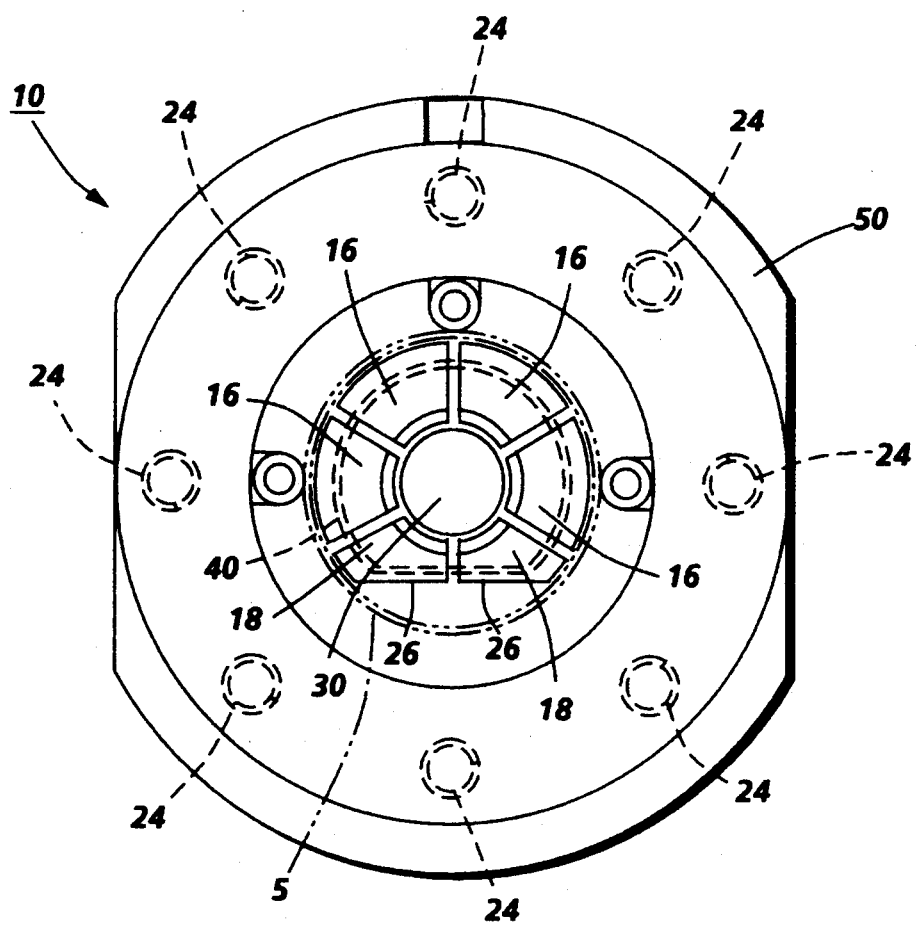
FIG. 2 is a plan view of FIG. 1.

Turning now to FIGS. 1 through 4C inclusive, the structure and operation of the end effector of the present invention will be described in more detail. FIGS. 1 and 2 illustrate the end effector, generally referred to by reference numeral 10. The end effector 10 consists of a generally cylindrical portion 14 which is segmented into a plurality of fingers 16 and 18. There is a cylindrical bore 17 located axially through the end effector 10. The lower end of the bore 17, is configured in a truncated conical section 19. A rod 28 extends through the bore 17 and ends with a conical section 30 adapted to fit within the truncated conical cavity 19 of the cylindrical portion 14 of the end effector 10. A resilient retaining ring 40, preferably constructed of a rubber or other elastic material, encircles the lower end of the cylindrical portion 14. The lower end of the cylindrical portion 14 is further provided with gripping surfaces 15 about its circumference. A collar 21 for abutting the surface of the object 5 to be acquired is formed in the top portion of the cylindrical portion 14.

The cylindrical portion 14 of the end effector 10 is resiliently mounted to the main head portion 22 of the end effector 10 through the use of springs 24 mounted in a radial pattern around the upper portion of the cylindrical section 14. The springs 24 allow the cylindrical section 14 of the end effector 10 to adapt to an article if the article is not in a perfectly vertical position when it is to be selected. The cylindrical portion 14 will deflect from vertical to allow the collar 21 to fully abut the surface 6 (FIG. 4C) of the article to be acquired.

Two of the finger portions 18 of the cylindrical section 14 (FIG. 2) are provided with adjacent flat surfaces 26. The flat surfaces 26 extend the length of the cylindrical portion 14 of the end effector 10. These flat surfaces 26 allow a cylindrical object 5 that has been picked up by the end effector 10 to be aligned in a horizontal position against a stop 60 (FIG. 4C) with the flat surfaces 26 facing downwards toward the stop 60 so as to allow the stop 60 to hold the cylindrical object 5 in position while the end effector 10 is withdrawn from the cylindrical object 5 without interference from the stop 60. The design of the fingers 16, 18 allows the object to be gripped and supported over a large portion of the circumference of the aperture. Thus, concentrated gripping forces are not required and delicate objects may be acquired without damage thereto.

Figure 3A:
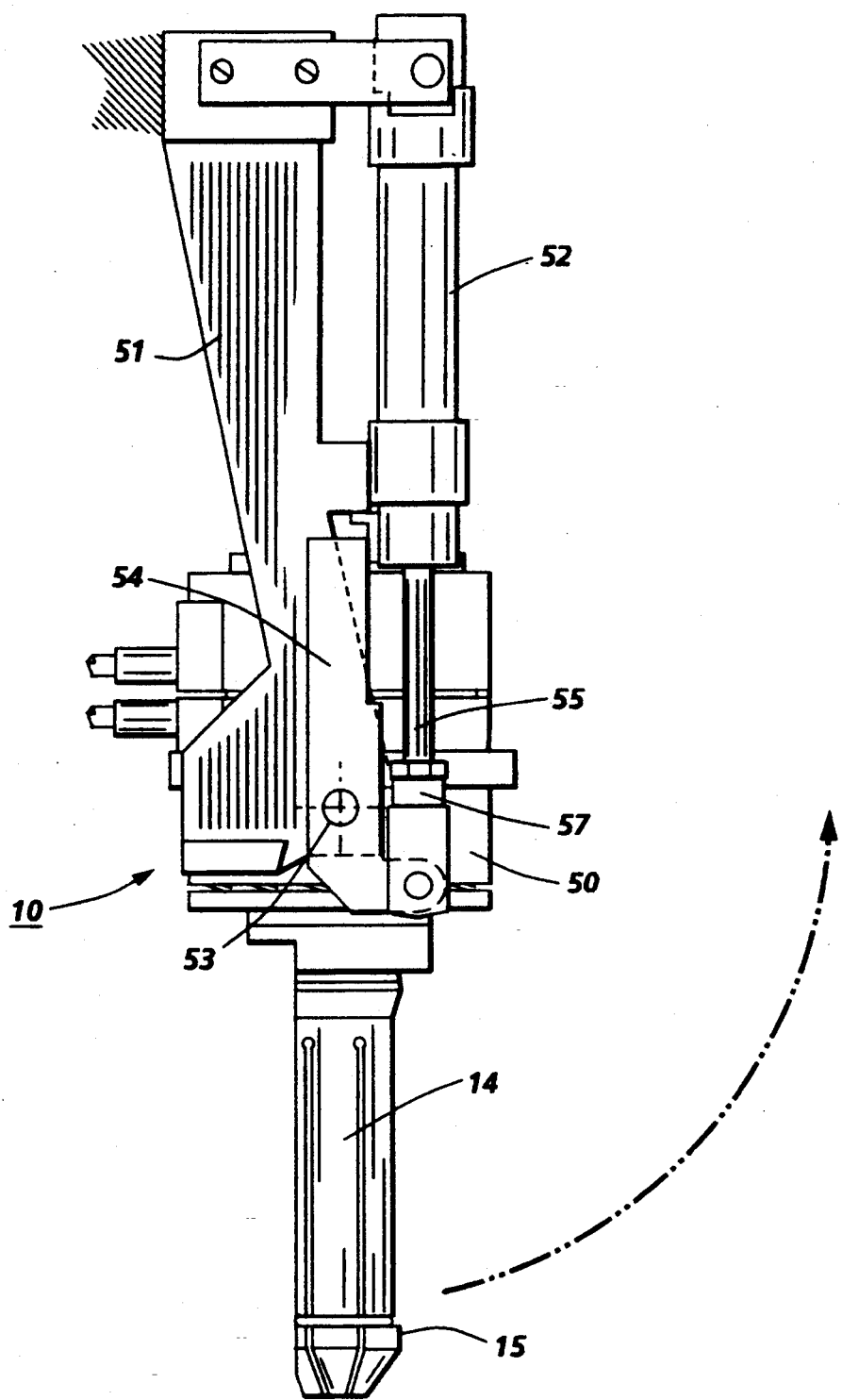
FIGS. 3A and 3B are side elevations illustrating the rotation of the end effector of FIG. 1.
Figure 3B:
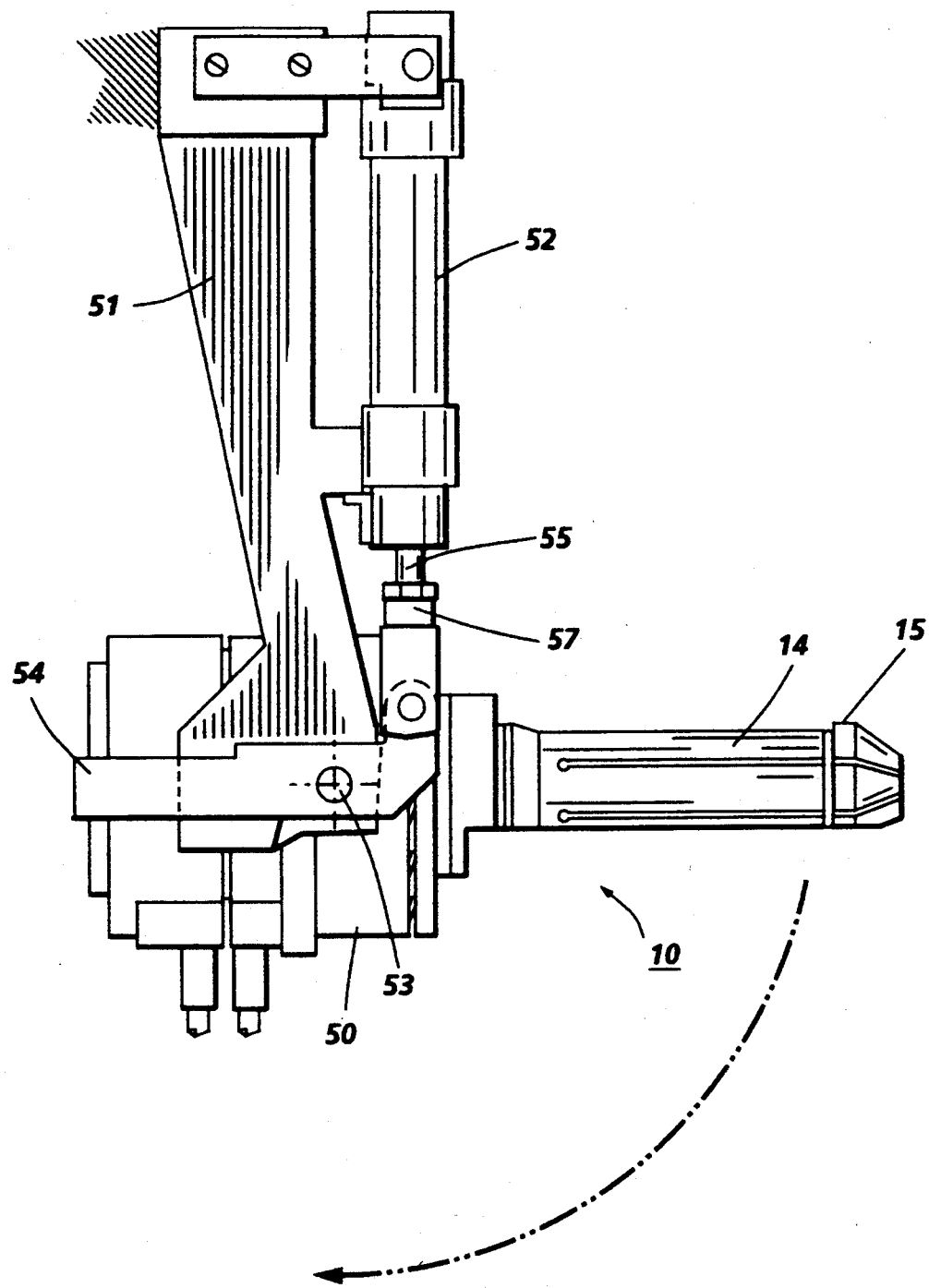

Turning now to FIGS. 3A and 3B, there is illustrated the mechanism which rotates the end effector from a substantially vertical position to a substantially horizontal position with the flat surfaces 26 facing down (FIG. 3B). The end effector 10 is mounted to a machine head 50 attached to a robotic assembly 51 about a pivot 53, by a pneumatic cylinder 52 and linkage 54. When a cylindrical object 5 has been acquired by the gripping surfaces 15 of the cylindrical section 14 of the end effector 10, the pneumatic cylinder 52 is actuated. As a result of the actuation of cylinder 52, the linkage 54, which connects the main head 50 with the end effector 10 and the pivot 53, the entire end effector 10 is caused to rotate from a substantially vertical position to a substantially horizontal position while maintaining the grip on cylindrical object 5. The amount of rotation about the pivot pin 53 can be adjusted by a threaded cylinder rod 55 and an adjusting nut 57 or other hard stops. Obviously, other actuation devices can be utilized to rotate the end effector 10 such as hydraulic cylinders, rack and pinion gears, motor driven gears or any other known electromechanical or mechanical devices.

Figure 4A:
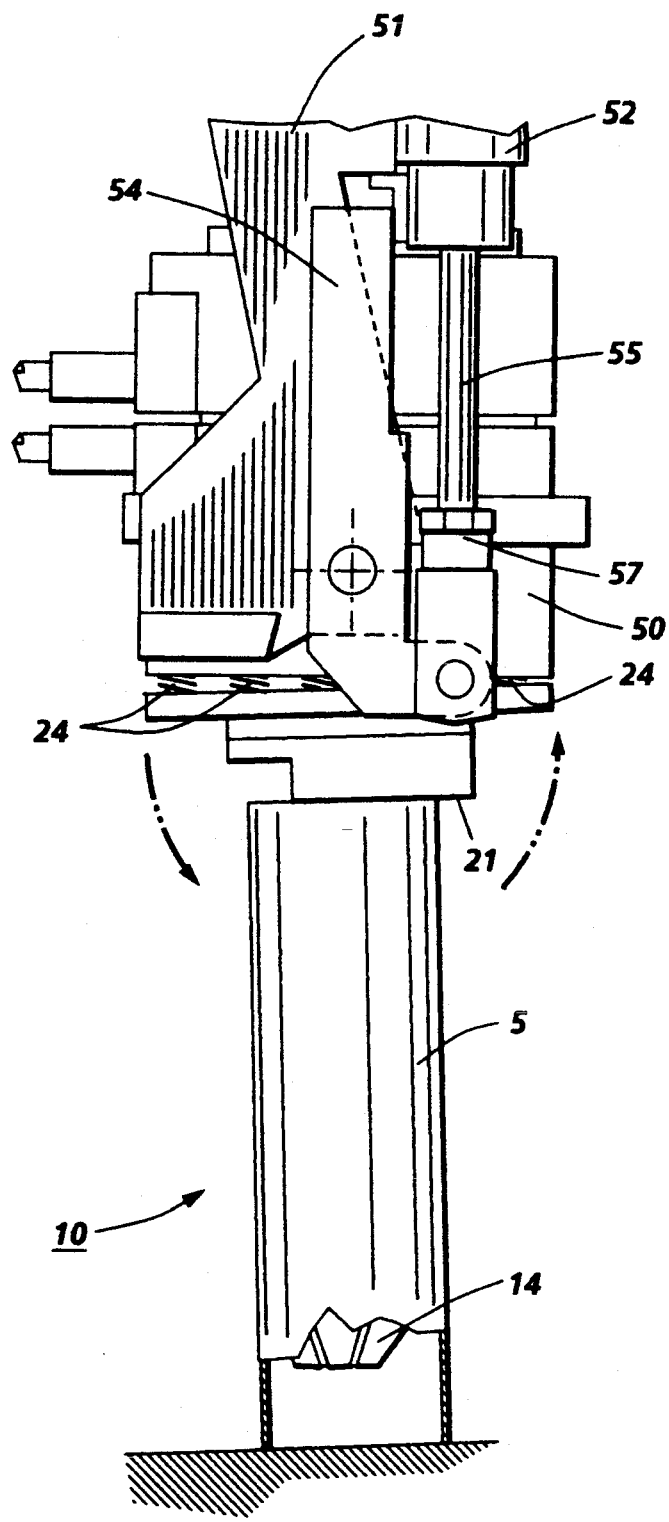
FIGS. 4A, 4B and 4C illustrate an operative cycle of the end effector of the present invention.
Figure 4B:
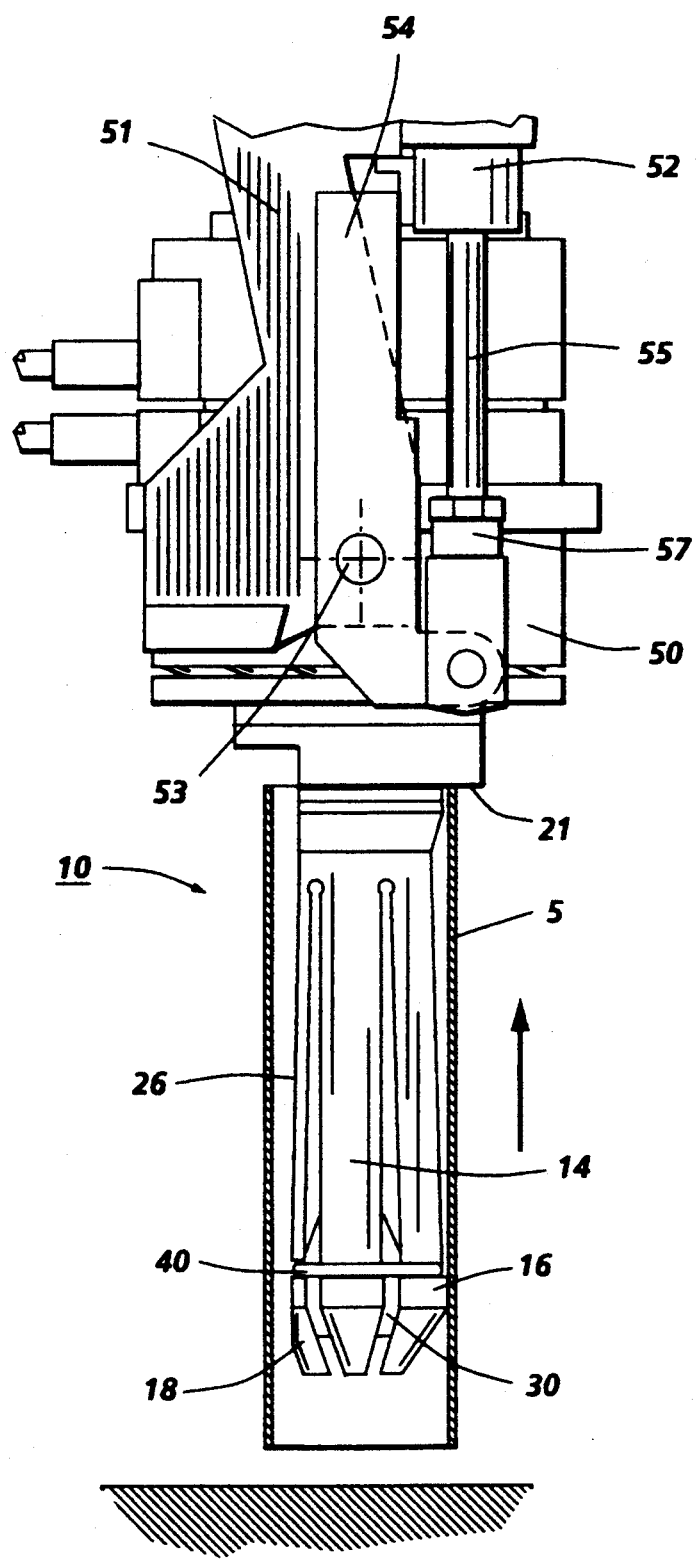
Figure 4C:
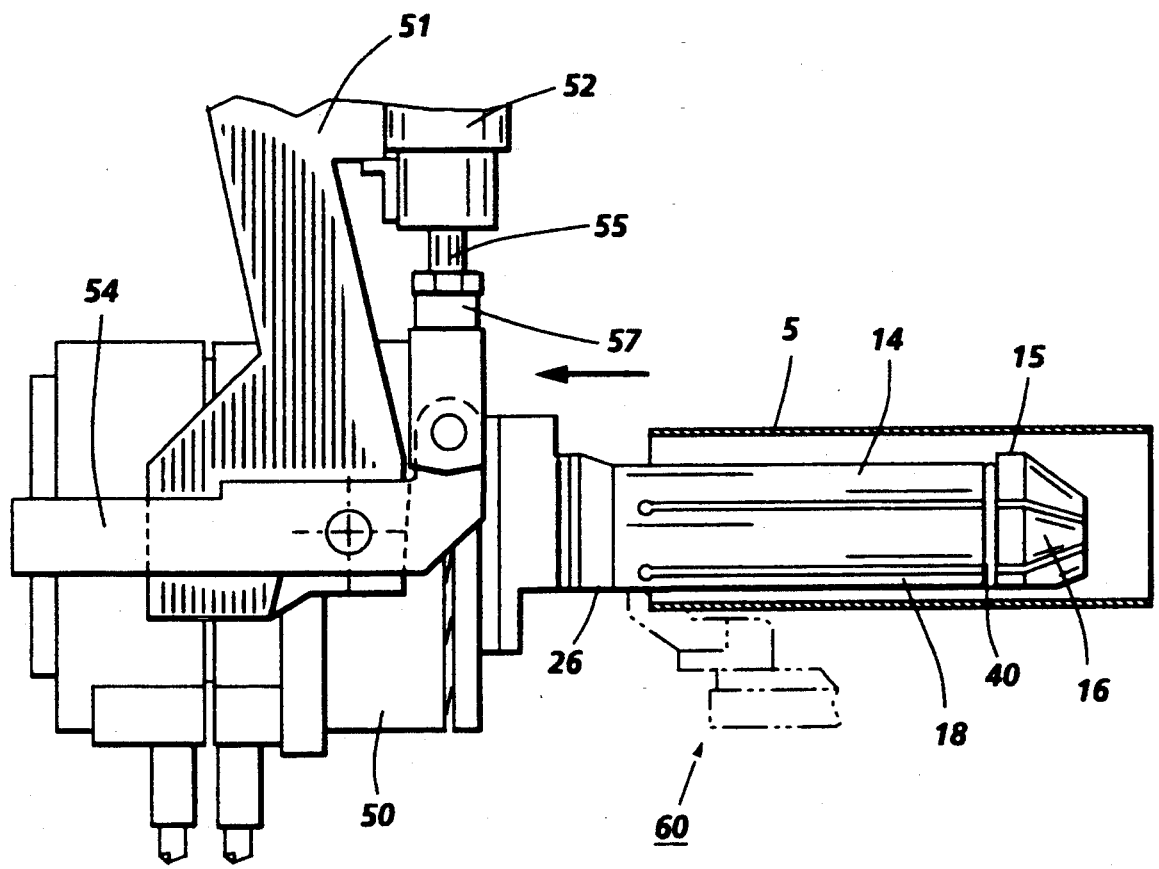

Turning now to FIGS. 4A through 4C, an exemplary cycle of operation of the end effector assembly 10 is illustrated. As seen in FIG. 4A, the cylindrical section 14 of the end effector 10 is moved by the robot assembly 51, and inserted into the interior cylindrical aperture of object 5 until the top of the object is against the collar 21 of the end effector assembly 10. As can also be seen in FIG. 4A, the spring mounts 24 allow the cylindrical section 14 of the end effector to adapt to the cylindrical object to be gripped even if the object is not in a perfectly vertical orientation. The springs 24 allow the central axis of the cylinder portion 14 of the end effector 10 to deviate from vertical while aligning the gripper surface 15 within the object. As illustrated in FIG. 4B, the rod 28 is then withdrawn up into the cylindrical portion of the end effector causing the fingers 16, 18 to expand in a radial direction until the gripping surfaces 15 contact the inside circumference of the cylindrical object 5. The rod 28 may be withdrawn by using a pneumatic or hydraulic cylinder, a screw device, a rack gear drive or other actuating devices. Once the gripping surfaces 15 of the cylindrical section 14 of the end effector 10 have contacted the inner circumference of the interior cylindrical aperture of object 5, the article 5 can then be picked up by operation of the robot assembly. At that time, the cylinder 52 is actuated causing the end effector to rotate from a substantially vertical orientation to a substantially horizontal orientation with the flat surfaces 26 facing down (FIG. 3).

As illustrated in FIG. 4C, the cylindrical object can then be set down on a pallet or the like, and tile end effector can be retracted by the robot assembly 51 until the top surface 6 of the cylindrical object 5 adjacent the collar 21 contacts a stop 60. The flat surfaces 26 on the fingers 18 of the cylindrical portion 14 of the end effector 10 allow the stop 60 to project inwardly beyond the wall thickness (FIG. 4C) of the cylinder 5, thus allowing the top end 6 of the cylinder 5 to contact the stop while the end effector 10 maintains its grip on the article 5. At that time, the rod can then be returned to its original position causing the fingers 16, 18 of the end effector to retract due to the resilient action of the retaining ring 40. As shown clearly in FIG. 4C, with the end effector in its horizontal position and the stop 60 projecting inwardly beyond the wall thickness of the cylindrical object 5 towards the flat surfaces 26, the end effector assembly 10 can then be withdrawn from the object 5 without interference from the stop 60 and the object 5 can then be advanced to other processing stations. The end effector 10 is then returned to the vertical position, as illustrated in FIG. 4A, and the cycle repeated.

The size of interior cylindrical apertures which can be gripped by the device can be adjusted by varying the length of the stroke of the rod 28 or by varying the steepness of the conical section 30 of the rod 28. Also different cylindrical sections 14 having larger or smaller circumference gripping surfaces 15 can be used with the same robotic head assembly 51. Thus, the apparatus is adaptable to a wide range of articles to be gripped and manipulated.

The entire operative cycle of the end effector can be operated manually or an object sensor (not shown) can be added to determine when the end effector 10 has been fully inserted into the cylindrical object 5 and the operation can proceed automatically. Various sensors, which are all well known in the art, to recognize when the cylindrical object has been obtained by the end effector are available. These sensors could include a pressure sensor in the collar 21 or an optical sensor mounted near the collar 21 which would have a beam interrupted by the wall of the cylinder 5.

The cylindrical section 14 of the end effector is preferably made of a durable, resilient material, such as nylon, which is relatively cheap and can be easily machined and replaced. Additionally, such a material, due to its inherent resiliency, requires no hinging device at the upper ends of the fingers 16, 18 and tends to return to the retracted position when the rod 28 is returned to the bottom position thereby requiring less of a resilient force to be exerted by the resilient retaining ring 40.

In recapitulation, there is provided a robotic end effector apparatus which allows the gripping and manipulation of an object having a cylindrical aperture therein. A resilient, longitudinally split sleeve is inserted into the cylindrical aperture of the object and the sleeve is then expanded in a radial direction until gripping surfaces around the circumference contact the inside circumference of the aperture in the object to be lifted and manipulated. The gripping device is further provided with a flat section to enable the cylindrical object that is being manipulated to be brought against a stop in a horizontal position while not interfering with the withdrawal of the end effector.

It is, therefore, apparent that there has been provided in accordance with the present invention, a robotic end effector that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for acquiring, manipulating and positioning an article having an interior wall defining a cylindrical aperture therein, the apparatus comprising:
   (a) gripping means for contacting the interior wall of the article, said gripping means including a first set of finger segments each having an outer surface contoured for making full contact with the interior wall of the article, a second set of finger segments each having an outer surface contoured for making only partial contact with the interior wall of the article, and a stop member against which the article can be positioned to project inwardly into non-contacting portions of said contoured outer surface of said second set of finger segments, said first and second set of finger segments defining a common and generally cylindrical central core;
   (b) means located in said central core for moving said first and said second set of finger segments from a non-expanded position out of contact with the interior wall of the article into an expanded position in contact with said interior wall; and
   (c) means connected to said gripping means for moving the gripping means and thus the supported article from a substantially vertical orientation into a generally horizontal orientation for positioning the article against the stop member.

2. The apparatus according to claim 1 wherein the non-contacting portions of said contoured outer surface of each finger segment of said second set of finger segments includes a longitudinally extending flat portion.

3. The apparatus according to claim 1 wherein said first and second sets of finger segments include a collar portion each for limiting forward travel of said gripping means into the cylindrical aperture of the article.

4. An apparatus for acquiring, manipulating and positioning a hollow cylindrical object having a shell thickness and interior walls defining an interior aperture, the apparatus comprising:
   (a) a stop member;
   (b) means for moving the object from a generally vertical orientation into a generally horizontal orientation for positioning against said stop member; and
   (c) a plurality of expandable members connected to said means for moving and having a common core and a generally cylindrical outer surface insertable into the interior aperture of the object for gripping the object by the interior walls, said generally cylindrical outer surface including a flat surface portion for facing downwardly when the object is moved into said generally horizontal orientation for positioning against the stop member, said flat surface portion allowing the stop member to project inwardly beyond the shell thickness of the object towards said common core of said expandable members, thereby enabling non-interference withdrawal of said expandable members from the interior aperture of the acquired such object stopped against the stop member.

5. The apparatus of claim 1 wherein said plurality of expandable members is mounted resiliently for deflectable movement along a vertical axis.

6. The apparatus of claim 4 wherein said flat surface potion of said expandable members extends substantially the length of said expandable members.

7. The apparatus of claim 6 wherein said plurality of expandable members is six.

8. The apparatus of claim 7 wherein said flat surface portion is formed on a plural number of adjacent expandable members of said six expandable members.

9. The apparatus of claim 8 wherein said plural number of adjacent expandable members is two.

* * * * *